Sept. 19, 1939.     B. M. LARSEN ET AL      2,173,450
METHOD AND MEANS FOR ARC WELDING THIN METAL SHEETS
Filed Nov. 19, 1937     2 Sheets-Sheet 1
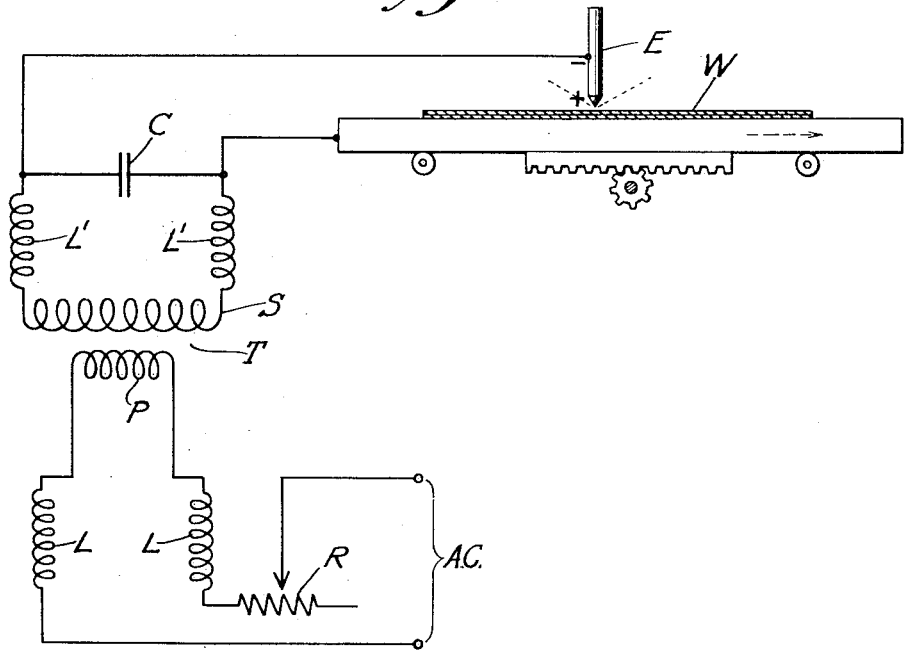
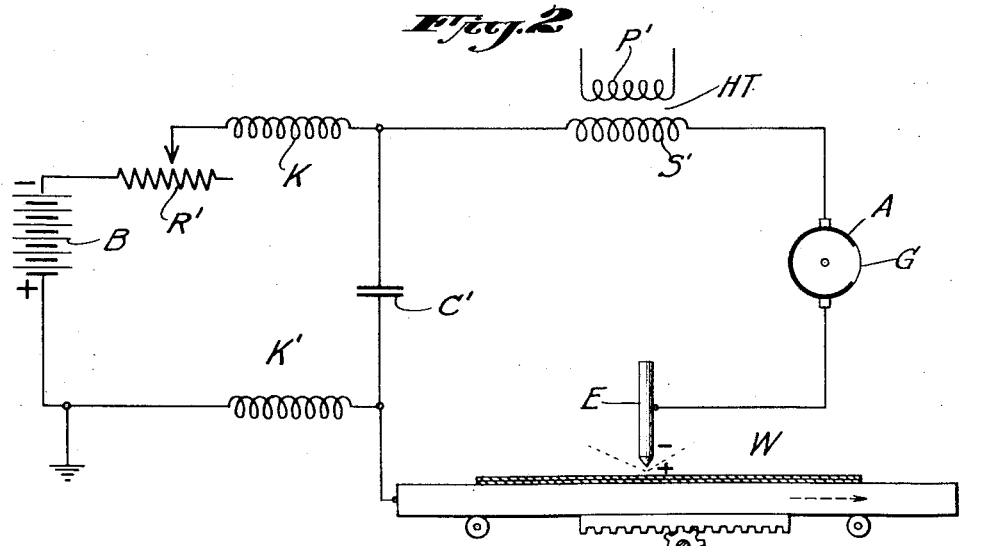
INVENTORS
BERNARD M. LARSEN.
MAX E. BERLEY.
KALMAN HEINDLHOFFER.
BY
ATTORNEYS.

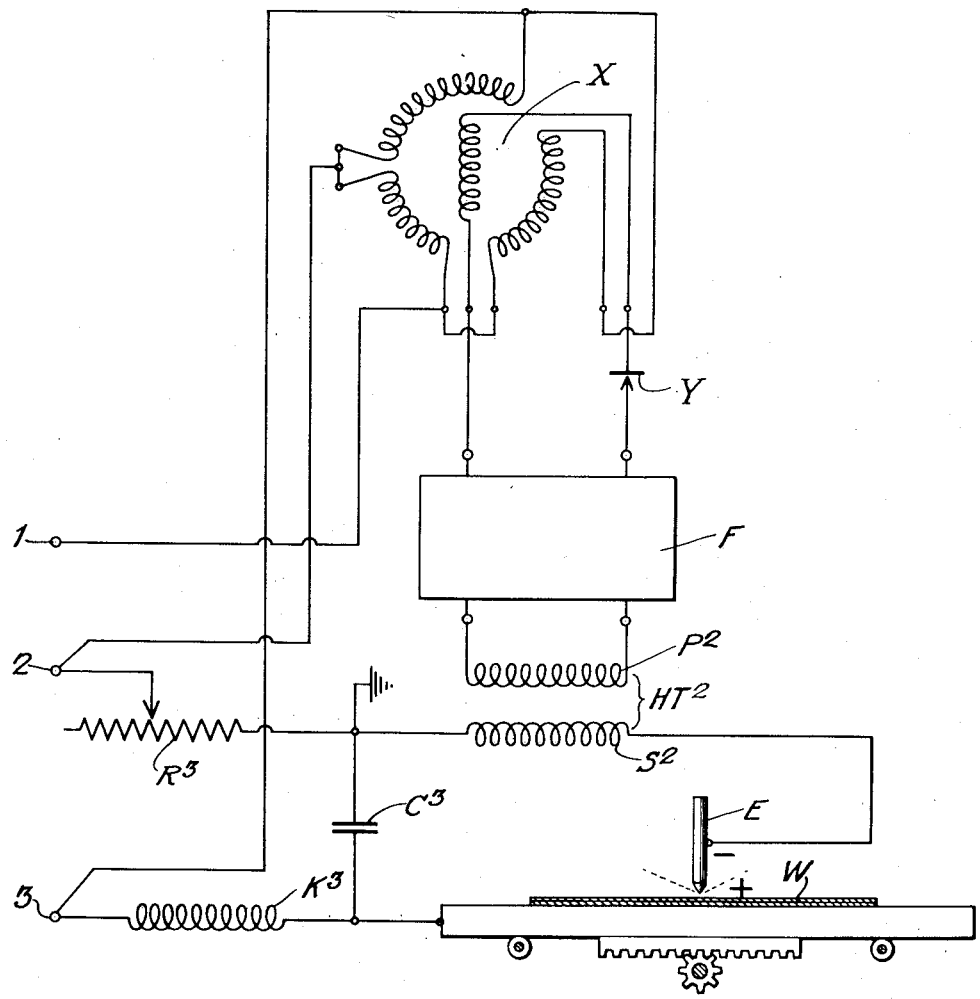

Patented Sept. 19, 1939

2,173,450

UNITED STATES PATENT OFFICE 2,173,450

METHOD AND MEANS FOR ARC WELDING THIN METAL SHEETS

Bernard M. Larsen, Elizabeth, Max E. Berley, Rutherford, and Kalman Heindlhofer, East Orange, N. J., assignors to United States Steel Corporation, New York, N. Y., a corporation of New Jersey Application November 19, 1937, Serial No. 175,510

10 Claims. (Cl. 219—8)

This invention relates to arc welding and more particularly to a method and to apparatus for welding thin gauge sheet metal with a machine guided electrode.

One of the objects of the present invention is to provide means to prevent random displacement of the welding arc from the intended welding path defined by the moving electrode. Another object is to provide means to progressively move the welding arc along the intended welding path defined by the moving electrode to thereby form a substantially continuous weld joint. Still another object is to provide an effective method and means to arc weld thin gauge sheet metal with a machine guided electrode. Another object is to provide an electrical circuit including means to supply a pulsating welding current to a machine guided electrode, means to supply a similarly pulsating arc igniting current to the said electrode, and means to provide for the simultaneous passage of the two said currents from the electrode to the said work piece only when the electrode is of negative potential with respect to the work piece.

Other objects and advantages will be apparent as the invention is more fully disclosed.

In accordance with these objects and advantages, we have devised the method and means of which the following description taken in connection with the accompanying drawings is a full and complete disclosure. Referring first to the drawings—

Fig. 1 is a schematic diagram illustrating the wiring diagram and its connection with a moving electrode and a work piece of one modification of the present invention; Fig. 2 is a similar diagram illustrating a second modification; and Fig. 3 is a similar diagram illustrating a third modification.

Machine arc welding, i. e. welding by means of a machine guided electrode, presents difficulties if it is applied to thin gauge sheet metals. One of these difficulties is in the reignition of the arc which frequently extinguishes itself. Ignition by contact might be possible, but the contact breaking time would be critical, for any delay would cause accumulation of heat which in the absence of any appreciable heat storing capacity of the thin sheet would produce localized high temperature, evaporation, hence holes at the joint. This difficulty has been overcome heretofore by superimposing upon the welding voltage a high frequency high voltage which under correst conditions causes a sufficiently powerful spark to jump across the arc gap to maintain the welding arc.

In our experiments on welding thin sheet we found that direct current gives a smoother seam than alternating current, as long as the work is made positive and the welding electrode negative; in the reversed case the result is inferior to alternating current welding. Moreover the consumption of the carbon welding electrode is very rapid in the latter case, slower with A. C., and very slow with D. C. in the reversed direction. The cause of this phenomenon is in the temperature difference between the electrodes, the positive being inherently hotter than the negative, due to the dualistic nature of electricity. However, we have found that a D. C. arc is unstable. This instability manifests itself in a random diplacement of the arc to the right and the left from the intended path prescribed by the moving electrode, and an occasional anchoring of the working end of the arc to a point on the work, causing various sized holes or "burns" to occur at this point by local evaporation of the metal. Since in this process the active end of the arc is anchored while the electrode is kept in uniform motion by the machine, it is inevitable that the arc elongates to a breaking point; subsequently it is restarted by the high frequency spark discharge at a new point determined by the closest distance between work and electrode. Obviously there is a gap in the weld between the point of anchoring and the point of reignition, therefore the welded path consists of correctly fused, and not fused intervals and a number of burnt holes. Moreover the weld path is not necessarily in line with the sheet edges, or the prescribed path of the moving electrode and will be found to be displaced to either side of that line on account of the lateral instability of the arc.

The lateral wandering of the arc and the anchoring of the arc can be overcome by supplying the welding current and the arc ignition current simultaneously in discrete pulses with an absolute pause between the pulses. The pauses are necessary to totally extinguish the arc during the pause period. The high frequency high voltage arc ignition current may be produced by an induction coil or by a high frequency source of power, the latter being generated by the old and simple spark method or by the more elaborate modern vacuum tube method and may be superposed upon the welding current. The high frequency high voltage current in reigniting the arc takes the shortest path between the electrodes and the work piece at the end of the pause period.

Pulsating power with an absolute pause or interruption is possible in several ways.

(a) By the use of an alternating electric power of inherently low voltage, worked up to a sufficiently high voltage across the welding arc gap by resonance until break down occurs during which a considerable amount of energy is suddenly released which has accumulated gradually during the pause in the condenser contained in the resonant circuit as indicated in the modification illustrated schematically in Fig. 1.

(b) By superimposing a high frequency source of electric power upon the arc welding current in such a manner as to make the welding current flow only in one direction, namely from the work to the electrode, thus making the work positive during the flow of the current. This can be accomplished in two ways, namely:

(1) By using D. C. power, superimposing upon it a high frequency power for the purpose of ignition of the arc, and interrupting the two currents by means of a mechanical interrupter as indicated in Fig. 2.

(2) By using a common A. C. power supply for both welding and high frequency, and interrupt the high frequency before the reversal in the direction of the welding current could take place. A short time interval during reversal exists during which the alternating current has a lower voltage that is insufficient to maintain an arc. A spontaneous restarting is now impossible without the aid of the spark supplied by the high frequency. Since the latter is generated by an apparatus connected to the same alternating current source it is possible to time it by appropriate phase shifting means and by the use of rectifying valves in such a way as to apply a high frequency high voltage current through the arc gap just when the alternating welding current is reversed in the direction of work to electrode thus reestablishing the arc in the correct polarity direction as indicated in Fig. 3. The resulting current is a pulsating direct current, although an alternating power supply is used omitting every other half wave.

The welding method of the present invention in which less than one-half of a cycle of an A. C. welding current is used, shows the effect of arc interruption on the finished work as a periodic thickening of the weld, which might be objectionable in certain cases. To overcome this difficulty we make the motion of the arc relative to the work non-uniform, i. e. fast during the active period and slow or even zero during the pause period, and may otherwise modify the relative movement of electrode and work piece to obtain a substantially continuous weld joint when and if desired.

Referring in greater detail to Fig. 1, the circuit means indicated includes an alternating current transformer T provided with primary winding P and secondary winding S. The primary winding P of transformer T is electrically connected through inductances L—L and adjustable resistance R to an alternating current source A. C. The secondary winding S is electrically connected to the work piece W and to the electrode E through inductances L'—L' with capacity C electrically connected, as shown, to form with the primary circuit what is known in the art as a resonance transformer or as an oscillating circuit with a natural period of oscillation which may be adjusted by inductances L—L and L'—L' to that of the period of oscillation in the A. C. source. In this circuit arrangement the current builds up to a peak voltage in the capacity C and discharges periodically across the space gap between the electrode E and the work piece W creating a welding arc. This periodic discharge may be regulated by regulating the power input to the primary circuit by resistance R, to occur with any given space gap, when the work piece W is at a positive potential with respect to the electrode E.

The relative movement of the electrode E and work piece W can be varied widely without departure from the present invention and may be continuous, intermittent or at successively varying rates coinciding with the arc discharge and pause periods, depending upon the nature of weld seam desired.

Referring now to Fig. 2, the circuit indicated schematically is one to be used when the welding current is direct current delivered, as for example, from battery B and the high frequency high voltage arc discharge igniting current is obtained from another source, as for example, high frequency transformer HT.

In the arrangement shown in Fig. 2, the negative side of battery B is electrically connected through a resistance R' and a high frequency choke coil K to interrupter device A with the secondary S' of transformer HT in series therewith.

The positive side of battery B is electrically connected to ground potential and through alternating current choke coil K' to the work piece W. The battery side of secondary winding S' is electrically connected through direct current blocking condenser C' to ground potential and to work piece W, thus completing the A. C. circuit across the space gap between electrode E and work piece W.

Interrupter A is indicated as a mechanical type alternator common in the art, having a rotating track (A) provided with an insulated gap G, which operates to periodically interrupt the flow of current along the track (A) to electrode E. Any other type of alternator device adapted to convert direct current into pulsating or periodically interrupted direct current for application to electrode E would be as effective for the purpose intended. The interrupter device, per se, forms no part of the present invention and further description of interrupter A is believed unnecessary to one skilled in the art.

In the arrangement illustrated in Fig. 2, the high frequency high voltage current from transformer HT can only flow across the space gap when the direct current welding current is flowing. Blocking condenser C' prevents short circuiting of the direct current welding circuit while insulating gap G is interrupting the flow of the welding current, and choke coils K—K' prevent the high frequency high voltage arc igniting current passing to the battery B. It is apparent that by regulating the speed of rotation of track A and the size of gap G, a wide variation in time of application of welding current and duration of pause period may be obtained. By also varying the relative movement of electrode and work piece to be continuous, intermittent or at successively varying rates a variation in the type of weld may be obtained, as in the modification of Fig. 1.

Referring now to Fig. 3, the modification indicated is one wherein the weld current and the arc ignition current is drawn from the same alternating current source and the circuit means provided is adapted to supply a welding current and an arc igniting current periodically across the space gap between electrode E and work piece W, as in the two previously described modifications when the work piece W is at a positive potential with respect to the electrode E.

In this modification the alternating current supply is three phase current and each phase is electrically connected to terminals 1, 2 and 3. The welding current is drawn from two of the phases (2, 3) and is applied directly across the space gap between electrode E and work piece W, as indicated, with resistance R³ in series to regulate the current. Secondary winding S² of high frequency transformer HT² is connected electrically in series with the electrode E on one side of the arc gap and this side preferably is grounded and a high frequency choke K³ is provided in the circuit in the opposite side of the arc gap to prevent short circuiting of the high frequency current flowing across the arc gap into the supply line. A capacity C³ is electrically connected in parallel with the spark gap to permit oscillation of the high frequency currents while the welding current is flowing to maintain the arc discharge across the gap.

The remainder of the circuit arrangement illustrated in Fig. 3, includes means to supply from the alternating current source an intermittent high frequency current to transformer HT², the periodic interruption of this current effectively controlling the ignition and extinguishing of the arc discharge between electrode E and work piece W and being adjusted as to phase to occur when the polarities of the electrode and work piece are negative and positive, respectively.

This is accomplished by a phase shifter means X, supplying current to high frequency generator F through half wave rectifier Y. The high frequency current output of generator F energizes primary winding P² of high frequency transformer HT².

By means of phase shifter X, the high frequency and low frequency currents are brought into phase coincidence and by means of rectifier Y only that half wave of the high frequency cycle is rectified which coincides with the polarity desired between electrode E and work piece W, and during the opposite half cycle no rectification occurs and therefore no high frequency current is generated by generator F. Accordingly, the arc discharge between electrode E and work piece W becomes extinguished during this latter half cycle as the voltage of the welding current is not sufficiently high to maintain the discharge. When the cycle reverses and rectifier Y again supplies current to generator F, the arc discharge is again ignited and welding current flows.

This arrangement produces a relatively high rate of uniform periodic welding and pause cycles depending upon the frequency of the high frequency high voltage current applied, and the frequency may be varied widely within the intent and scope of the present invention. By also regulating and varying the relative movement of electrode and work piece as hereinabove described, the type of weld obtained may be varied.

The particular circuit arrangement including phase shifter X, half wave rectifier Y and high frequency generator F forms per se no part of the present invention and is relatively old in the art and accordingly need not be more fully described to those skilled in the art.

From the above description of the three modifications of the present invention schematically illustrated in Figs. 1 to 3 inclusive, it is apparent that many modifications and adaptations of the invention may be made without departure from the nature and scope thereof, as may be included within the scope of the accompanying claims.

What we claim is:

1. The method of welding thin metal sheets which comprises disposing a welding electrode in spaced relation to the said sheets, moving the sheet relative to the electrode to cause the electrode to traverse a prescribed path over the sheet, and passing an electric current consisting of a welding current component and an arc maintaining component intermittently across the space gap between the said electrode and the said sheets, and maintaining the said sheets during the time interval the welding current passes across the said gap at a positive potential relative to the said electrode.

2. The method of feeding a welding current across the space gap between an electrode and a moving work piece which comprises applying a welding current and an arc sustaining current intermittently and simultaneously across the said space gap and maintaining the potential of the work piece positive with respect to that of the electrode during the passage of the two said currents.

3. The method of claim 1, in which the welding current is pulsating direct current and the arc maintaining current is high frequency high voltage alternating current and in which the high frequency current is interrupted periodically to limit the passage of the same to the time interval of passage of the pulsating direct current across the said space gap.

4. The method of claim 1, in which the welding current is low voltage alternating current at least a portion of which is built up by oscillation to a higher voltage effective to periodically break down the resistance of the said space gap, allowing the welding current to flow across the said space gap, and where the period intervening between each said discharge is timed by regulation of the power input to the oscillating circuit to bring each such periodic discharge within that phase of the cycle during which the potential of the work piece is positive.

5. Welding apparatus including a welding electrode, means to sustain the welding electrode with the working end in spaced relation to a work piece, means to obtain relative movement between the work piece and the electrode such as to cause the electrode to prescribe a desired welding path along the said work piece, means to intermittently apply an electric current comprised of two components across the space gap between the said electrode and work piece, one component consisting of a low voltage welding current and the other component consisting of a higher voltage high frequency arc igniting current, and means to limit the flow of said welding current across the space gap to the time interval when the electric potential of the work piece is positive to the electric potential of the said electrode.

6. Welding apparatus including a welding electrode, means to sustain the welding electrode with the working end in spaced relation to a work piece, means to obtain relative movement between the work piece and the electrode such as to cause the electrode to prescribe a desired welding path along the said work piece, means to apply simultaneously a low voltage welding current and a higher voltage high frequency arc maintaining current across the space gap between said electrode and said work piece, means to simultaneously interrupt the two said currents at periodic time intervals for short periods of time effective to extinguish the arc discharge across the said space gap, and means to maintain the electric potential of said work piece positive with respect to the said electrode during the time interval the welding current is passing across the said space gap.

7. Welding apparatus including a welding electrode, means to sustain the welding electrode with the working end in spaced relation to a work piece, means to obtain relative movement between the work piece and the electrode such as to cause the electrode to prescribe a desired welding path along the said work piece, means to apply a direct current welding current across the space gap between said electrode and work piece with the electrode at a negative potential relative to the said work piece, means to periodically interrupt the said welding current, means to apply a high frequency high voltage alternating current across said space gap, and means to interrupt the flow of said high frequency voltage simultaneously with the interruption of said welding current.

8. Welding apparatus including a welding electrode, means to sustain the welding electrode with the working end in spaced relation to a work piece, means to obtain relative movement between the work piece and the electrode such as to cause the electrode to prescribe a desired welding path along the said work piece, means to apply an electric current consisting of a welding current component and an arc maintaining component across the space gap between the electrode and said work piece, means to periodically interrupt said current for a time interval at least adapted to totally extinguish the welding arc, and means to regulate the time interval of flow of said current intermediate the periodic interruption to the period the work piece is at a positive electrical potential with respect to said electrode.

9. Welding apparatus including a welding electrode, means to sustain the welding electrode with the working end in spaced relation to a work piece, means to obtain relative movement between the work piece and the electrode such as to cause the electrode to prescribe a desired welding path along the said work piece, means to apply an electric current consisting of a welding current component comprised of direct current and an arc maintaining component comprised of high voltage high frequency alternating current across the space gap between the electrode and said work piece, means to periodically interrupt said current for a time interval at least adapted to totally extinguish the welding arc, and means to regulate the time interval of flow of said current intermediate the periodic interruption to the phase during which the work piece is at a positive electrical potential with respect to said electrode.

10. Welding apparatus including a welding electrode, means to sustain the welding electrode with the working end in spaced relation to a work piece, means to obtain relative movement between the work piece and the electrode such as to cause the electrode to prescribe a desired welding path along the said work piece, means to apply a welding current comprised at least in part of high voltage high frequency currents across the space gap between the electrode and said work piece, means to periodically interrupt said current for a time interval at least adapted to totally extinguish the welding arc, and means to regulate the time interval of flow of said current intermediate the periodic interruption to the period the work piece is at a positive electrical potential with respect to said electrode.

BERNARD M. LARSEN.
MAX E. BERLEY.
KALMAN HEINDLHOFER.